United States Patent [19]
Yokoi et al.

[11] Patent Number: 5,332,431
[45] Date of Patent: Jul. 26, 1994

[54] ANTIFOULING PAINT

[75] Inventors: Junji Yokoi, Ikoma; Akio Harada, Nara; Hiroharu Ohsugi, Hirakata, all of Japan

[73] Assignee: Nippon Paint Co., Ltd., Osaka, Japan

[21] Appl. No.: 40,980

[22] Filed: Mar. 31, 1993

[30] Foreign Application Priority Data

| Jul. 1, 1992 | [JP] | Japan | 4-214475 |
| Aug. 19, 1992 | [JP] | Japan | 4-264044 |
| Mar. 31, 1993 | [JP] | Japan | 4-124037 |

[51] Int. Cl.$^5$ .................. C09D 5/14; C09D 5/16
[52] U.S. Cl. ............... 106/15.05; 106/18.32; 424/78.09; 514/63; 523/122; 504/121
[58] Field of Search ............. 106/15.05, 18.32; 523/122; 528/38, 33; 424/78.09; 514/63; 71/67; 504/121

[56]   References Cited
U.S. PATENT DOCUMENTS

| Re. 30,909 | 4/1982 | Law et al. | 106/15.05 |
| 4,228,065 | 10/1980 | Genth et al. | 106/18.32 |
| 4,248,992 | 2/1981 | Takago | 106/18.32 |
| 4,404,014 | 9/1983 | Kotzsch et al. | 106/15.05 |
| 4,500,337 | 2/1985 | Young et al. | 106/15.05 |
| 4,898,895 | 2/1990 | Masuoka et al. | 106/15.05 |
| 5,116,611 | 5/1992 | masuoka et al. | 106/15.05 |
| 5,178,675 | 1/1993 | Sexsmith | 106/15.05 |

Primary Examiner—Anthony Green
Attorney, Agent, or Firm—Wenderoth, Lind & Ponack

[57]  ABSTRACT

An antifouling paint containing as an active component, in an amount of 5 to 100% by weight of the non-volatile of the paint, an alkylphenoxy group containing organo-silicon compound selected from an organo-silane, a bis-silyl compound and a polysiloxane, the alkyl being a straight or branched $C_7$ to $C_{12}$ alkyl of the formula: $C_xH_{2x+1}$ (in which x is 7 to 12) or a 1-methyl-1-phenylethyl group.

The novel antifouling paint of the invention can afford a long-lasting, strong antifouling effect when used as a marine paint.

5 Claims, No Drawings

ANTIFOULING PAINT

FIELD OF THE INVENTION

The present invention relates to an antifouling paint which is less toxic to human beings, is very safe to surroundings and has a strong antifouling effect.

BACKGROUND OF THE INVENTION

Marine structures, inclusive of ships, offshore structures, sea water conduit systems of seaside plants, fishnets, culture rafts and buoys, are favorite habitats of large attached animals and plants, such as barnacles, hard-shell mussels, sea lettuce (green laver), etc., attached diatoma, bacteria and other microorganisms, all of which cause corrosion of these structures, increased seawater resistance of slips, clogging of fishnets which may induce a massive death of the fish caught therein, and increased structure weights which lead to sinking and decreased operation efficiencies.

In order to prevent such damages due to harmful aquatic life, the submerged structures, ships, fishnets and the like have heretofore been coated with antifouling paints which are mostly based on organocopper compounds or organotin compounds. Such paints are usually compounded with, as a part of the coating vehicle, a rosin and the toxicant is usually dissolved out of the coating with the said rosin.

Also, an antifouling paint containing, as a resinous vehicle, a trialkyl tin polymer has been used as an hydrolysis type antifouling paint. In this type of paint, the trialkyl tin polymer is hydrolyzied in a weak alkaline sea water, liberating an organotin compound and and at the same time, the polymer vehicle is connected into a soluble type and is gradually dissolved in sea water together with the toxic organotin compound. In either type of antifouling paints, the dissolved toxicants are very toxic to the sea living, thereby killing or weakening the animals or plants and attaining the antifouling effects desired. These toxicants are also harmful to human beings and hence the heretofore proposed paints have serious problems in respect to safety and hygiene for operators and further result in less pollution of the environment.

The inventors have formerly described in Japanese Patent Application No. 59344/90 (Publication No. 128302/91) a noxious aquatic control agent, containing as a toxicant, an alkyl substituted phenol derivative of the formula:

in which R is a straight or branched alkyl having 3 to 21 carbon atoms; A is a hydrogen atom, hydroxy group or a methoxy group; and s is an integer of 1 to 5, providing that at least one A is a hydroxy or a methoxy group. However, an antifouling paint containing the above-mentioned phenol derivative is not so useful because of the soluble natures of the toxicant. Furthermore, in Japanese Patent Application No. 224452/62, a coating composition has been proposed containing as a vehicle a reaction product of a silane compound represented by the formula:

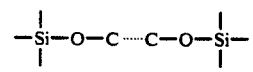

in which $R^4$ is an alkyl group, a haloalkyl group, a cycloalkyl group, an aryl group or an aralkyl group, $R^5$ is a hydrogen atom, an alkyl group or an cycloalkyl group, and t is 0 or an integer of 1 to 3, and/or its low condensation product, an organic compound having in its molecule at least 2 hydroxyl groups, and a monohydric phenol compound. The coating obtained is said to have a strong and long-lasting antifouling and anti-mold effects due to the strong anti-bacterial and anti-mold activities of the monohydric phenol component attached to the silane and the activities of the main structural portion of the formula:

$$-\underset{|}{\overset{|}{Si}}-O-C-C-O-\underset{|}{\overset{|}{Si}}-$$

In that patent application, the following are mentioned as examples of the monohydric phenol compound: phenol; alkyl phenols such as o-cresol, m-cresol, p-cresol, 2,3-xylenol, 2,4-xylenol, 2,5-xylenol, 2,6-xylenol, 3,4-xylenol, 3,5-xylenol, o-ethyl phenol, m-ethyl phenol, p-ethyl phenol, p-t-amyl phenol, p-t-butyl phenol, p-phenyl phenol, p-cyclohexyl phenol; alkoxy phenols such as m-methoxy phenol; halogen substituted phenols such as o-chlorophenol, p-chlorophenol, 2,4,6-trichlorophenol, pentachlorophenol, 2,4,6-tribromophenol; nitophenols as o-nitro phenol, p-nitro phenol, 2,4-dinitro phenol, 2,4,6-trinitrophenol; amino substituted phenols such as p-dimethylamino phenol; cyano phenols as p-cyanophenol and the like.

However, these phenols are comparatively water soluble and therefore, when hydrolyzed and released in the environment, there are problems in safety. Furthermore, the desired long-lasting antifouling effects cannot be attained because they are, after being hydrolyzed, quickly dissolved out in sea water due to their excellent water solubilities.

Alkoxy, halogen, nitro, amino and cyano substitutede phenols are very highly water soluble, causing harmuful effects in suroundings.

The inventors have also previously proposed in Japanese Patent Application No. 127025/91, an antifouling composition for fishnet use, comprising an alkyl phenol compound of the formula:

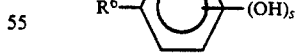

in which $R^6$ is a straight or branched alkyl having 4 to 21 carbon atoms; and s is an integer of 1 to 5, a repellent type compound such as silicone oil, and an antifouling agent such as dichlorophenyl dimethyl urea. However, this is likewise still short in antifouling activity and further improvement has long been desired.

In Japanese Patent Application Nos. 286355/89, 316814/89, 55396/88, 21751/88, and 50232/88, it has been proposed to utilize phenol compounds in antifouling paints wherein polymers or copolymers of vinyl monomers are connected to various phenol compounds are connected through ester bonds and also phenol modified resins are employed which are derived from compounds obtained by the addition reaction of various phenols and carboxylic anhydrides. In these polymers, the phenol compounds are connected to the side chains of the polymers through ester bonds and such phenol esters are believed to be quite difficult in the control of their hydrolysis rates in sea water.

It is, therefore, an object of the invention to provide a novel and effective antifouling paint which is free from the abovementioned problems.

SUMMARY OF THE INVENTION

According to the present invention, the abovementioned object can be attained by the antifouling paint consisting essentially of an alkylphenoxy group containing an organo-silicon compound having in its molecule at least one alkylphenoxy group of the formula:

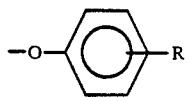

in which R stands for a straight or branched chain alkyl group of the formula: $C_xH_{2x+1}$ in which x is an integer of 7 to 12, or a 1-methyl-1-phenylethyl group, in an amount of 5 to 100% by weight of the non-volatile of the paint, and a solvent.

More specifically, the abovementioned alkyl phenoxy group containing organo-silicon compound is either one of the following:

(1) a silane compound containing at least one alkylphenoxy group of the formula:

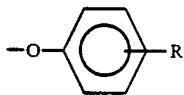

in which R stands for a straight or branched chain alkyl group of the formula: $C_xH_{2x+1}$ in which x is an integer of 7 to 12, or 1-methyl-1-phenylethyl group.

(2) an alkylphenoxy bis-sylyl compound represented by the formula:

$X^1{}_3Si-(CH_2)_n-SiX^1{}_3$ in which $X^1$ is selected from the group consisting of a hydrogen atom, a hydroxy group, a lower alkyl group having 1 to 5 carbon atoms, a lower alkoxy group having 1 to 5 carbon atoms, a phenyl group, a phenoxy group, a vinyl group, an acetoxy group, a propenyloxy group, a methyl ethyl ketoxim group, and alkyl phenoxy group wherein the alkyl is a straight or branched chain alkyl having 7 to 12 carbon atoms and a 1-methyl-1-phenylethyl phenoxy group, providing that at least one of said $X^1$ is the straight or branched chain alkyl phenoxy group or 1-methyl-1-phenylethyl phenoxy group, and n is an integer of 1 to 10, (3) an alkylphenoxy polysiloxane represented by the formula:

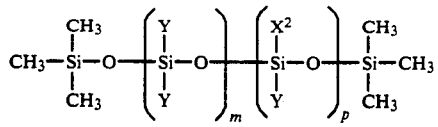

having a number average molecular weight of less than 100,000 in which Y is the same or different and each represents a member selected from the group consisting of alkyl having 1 to 3 carbon atoms, a vinyl group and a phenyl group; $X^2$ is a member selected from the group consisting of a hydrogen atom, a halogen atom, a hydroxy group, an alkoxy group, acyl group, an oximegroup, an amido group, a propenoxy group, an alkyl phenoxy group in which the alkyl is a straight or branched chain alkyl having 7 to 12 carbon atoms and 1-methyl-1-phenylethyl phenoxy group, providing that at least one $X^2$ is the abovesaid alkyl phenoxy group or 1-methyl-1-phenylethyl phenoxy group; m is 0 or an integer of 1 or more; and p is an integer of 1 or more.

(4) an alkylphenoxy polysiloxane represented by the formula:

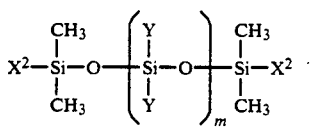

having a number average molecular weight of less than 100,000 in which the Y radical is the same or different radical and each represents a member selected from the group consisting of an alkyl having 1 to 3 carbon atoms, a vinyl group and a phenyl group; $X^2$ is a member selected from the group consisting of a hydrogen atom, halogen atom, a hydroxy group, an alkoxy group, an acyl group, an oxime group, an amido group, a propenoxy group, an alkyl phenoxy group in which the alkyl is a straight or branched chain alkyl having 7 to 12 carbon atoms and 1-methyl-1-phenylethyl phenoxy group, providing that at least one $X^2$ is the abovesaid alkyl phenoxy group or 1-methyl-1-phenylethyl phenoxy group; and m is 0 or an integer of 1 or more, (5) an alkylphenoxy polysiloxane represented by the formula:

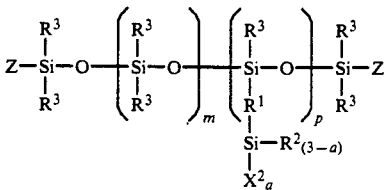

having a number average molecular weight of less than 100,000 in which Z is an $-R^3$ or an $-R^1-SiR^2{}_{(3-a)}X^2{}_a$ group, $R^1$ is an alkylene or aralkylene group having 2 to 20 carbon atoms which may include an ether, a thioether, an ester or a urethane bond; $R^2$ is an alkyl having 1 to 6 carbon atoms, phenyl or cycloalkyl having up to 6 carbon atoms; $R^3$ is an alkyl having 1 to 10 carbon atoms, an aryl or an aralkyl group; $X^2$ is a member selected from the group consisting of a hydrogen atom, a halogen atom, a hydroxy group, an alkoxy group, an acyl group, an oxime group, an amido group, a propenoxy group, an alkyl phenoxy group in which the alkyl is a straight or branched chain alkyl having 7 to 12 carbon atoms and 1-methyl-1-phenylethyl phenoxy group, providing that at least one $X^2$ is the abovementioned alkyl phenoxy group or 1-methyl-1-phenylethyl phenoxy group; m is 0 or an integer of 1 or more; p is an integer of 1 or more; and a is an integer of 1 to 3.

The abovementioned silicon containing organic compounds used as an active component of the present antifouling composition are characterized in that at least one particular alkyl phenoxy group or 1-methyl-1-phenylethyl phenoxy group is/are included in the molecule thereof.

The inventors, having studied silylation of various alkyl phenols, have surprisingly found that when $C_7$-$C_{12}$ alkyl substituted or 1-methyl-1-phenylethyl substituted phenoxy group(s) is (are) incorporated into silane compounds, the thus obtained organo-silicon compounds can exhibit excellent antifouling effects and a higher degree of safety. The inventive concept was further developed to other silicon containing compounds as various silyl compounds and polysiloxanes, and on the basis of these findings, the present invention was established.

The first type of substituted phenoxy containing organo-silicon compounds used in the present invention is an organosilane containing at least one alkylphenoxy group of the formula:

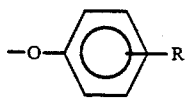

in which R stands for a straight or branched chain alkyl group of the formula: $C_xH_{2x+1}$ in which x is an integer of 7 to 12, or a 1-methyl-1-phenylethyl group.

Such organosilanes are easily prepared by the silylation of alkyl phenols having particular alkyl groups and more specifically, by the reaction of such silyl compounds as an organosilanol, an organohalosilane, an organo alkoxy silane and an organo acyloxy silane, with an alkyl phenol through dehydration, dehydrohalogenation, dealcoholation or a de-organo acidic reaction. The thus obtained alkylphenoxy group containing organo-silicon compounds are characterized in that at least one particular phenoxy silyl moiety of the formula:

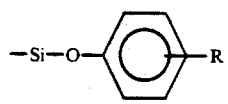

(I)

in which R stands for a straight or branched chain alkyl group having 7 to 12 carbon atoms or a 1-methyl-1-phenylethyl group is always included in the molecule.

The alkyl phenols to be silylated are characterized in that among 5 hydrogen atoms attached to the benzene ring of the phenol, at least one hydrogen is substituted with a straight or branched chain alkyl group having 7 to 12 carbon atoms or 1-methyl-1-phenylethyl group (hereinafter called as the present alkyl phenol).

The size of the alkyl group of the present alkyl phenol, i.e. the carbon number, has an important meaning for the desired effects in the present invention. That is, other phenols bearing with a $C_1$-$C_5$ alkyl group or a cyclic hydrocarbon as a phenyl or cyclohexyl group are, even when silylated, are not so useful in an antifouling paint because the formed silyl derivatives are easily hydrolyzed and the liberated alkyl phenols are very soluble in water. The alkyl groups having 13 or more carbon atoms are likewise undesired because such alkyl phenols, even when silylated, cannot give the desired antifouling effects. Thus, the alkyl moiety should have 7 to 12 carbon atoms or should be a 1-methyl-1-phenylethyl group.

As already stated, the present alkyl phenoxy group containing organosilanes may be prepared by the reaction of silyl compounds such as organosilanol, an organohalosilane, an organo alkoxysilane and an organo acyloxysilane, with an alkyl phenol through dehydration, a dehydrohalogenation, a dealcoholation or a de-organo acidic reaction. Examples of silyl compounds to be reacted with the present alkyl phenols are trimethyl silanol, dimethyl disilanol, triethyl silanol, triphenyl silanol, diphenyl disilanol, methylphenyl disilanol, trimethyl chlorosilane, dimethyl dichlorosilane, methyl trichlorosilane, triethyl chlorosilane, diethyl dichlorosilane, ethyl trichlorosilane, triphenyl chlorosilane, diphenyl dichlorosilane, phenyl trichlorosilane, methyl phenyl dichlorosilane, ethyl phenyl dichlorosilane, trimethylmethoxysilane, dimethyl dimethoxysilane, methyl trimethoxy silane, propyl trimethoxy silane, butyl trimethoxy silane, decyl trimethoxy silane, hexadecyl trimethoxy silane, phenyl trimethoxy silane, diphenyl dimethoxy silane, cyclohexyl methyl dimethoxy silane, gamma-aminopropyl trimethoxy silane, gamma-(2-aminoethyl)aminoproyl trimethoxy silane, gamma-(2-aminoethyl)aminopropyl methyl dimethoxy silane, vinyl trimethoxy silane, gamma-glycidoxy propylmethyl dimethoxy silane, gamma-glycidoxy propyl trimethoxy silane, gamma-methacryloxy propylmethyl dimethoxy silane, gamma-dibutylaminopropyl trimethoxy silane, gamma-methacryloxypropyl trimethoxy silane, nona-fluorobutylethyl trimethoxy silane, gamma-chloropropyl trimethoxy silane, methyl triethoxy silane, trimethyl ethoxy silane, gamma-ureidopropyl triethoxy silane, gamma-mercaptopropyl trimethoxy silane, trimethyl acetoxy silane, dimethyl diacetoxy silane, methyl triacetoxy silane, ethyl triacetoxy silane, phenyl triacetoxy silane, vinyl triacetoxy silane, n-dodecyl triethoxy silane, n-hexyl trimethoxy silane, n-octadecyl dimethyl methoxy silane, dimethyl butyl chlorosilane, dimethyloctadecyl chlorosilane and the like.

Examples of the alkylphenoxy group containing organosilanes used in the present invention are:

(In the following, alkyl represents a straight or branched $C_xH_{2x+1}$-group, in which x is an integer of 7 to 12, or 1-methyl-1-phenylethyl group)

mono(alkylphenoxy) trimethyl silane
mon(alkylphenoxy) dimethyl silanol di(alkylphenoxy) dimethyl silane
mon(alkylphenoxy) triethyl silane
mono(alkylphenoxy) triphenyl silane
mono(alkylphenoxy) diphenyl silanol
di(alkylphenoxy) diphenyl silane
mono(alkylphenoxy) methyl phenyl silanol
di(alkylphenoxy) methyl phenyl silane
di(alkylphenoxy) ethyl phenyl silane
tri(alkylphenoxy) ethyl phenyl silane
tri(alkylphenoxy) propyl silane
di(alkylphenoxy) propyl methoxy silane
mono(alkylphenoxy) dimethoxy silane
tri(alkylphenoxy) butyl silane
di(alkylphenoxy) butyl methoxy silane
mono(alkylphenoxy) butyl dimethoxy silane
tri(alkylphenoxy) decyl silane
di(alkylphenoxy) decyl methoxy silane
mono(alkylphenoxy) decyl dimethoxy silane
tri(alkylphenoxy) hexadecyl silane
di(alkylphenoxy) hexadecyl methoxy silane
mono(alkylphenoxy) hexadecyl dimethoxy silane
mono(alkylphenoxy) cyclohexylmethyl methoxy silane
di(alkylphenoxy) cyclohexyl methyl silane
tri(alkylphenoxy) aminopropyl silane
di(alkylphenoxy) aminopropyl methoxy silane
mono(alkylphenoxy) aminopropyl dimethoxy silane
tri(alkylphenoxy) gamma-(2-aminoethyl) aminopropyl silane
di(alkylphenoxy)-gamma-(2-aminoethyl)aminopropyl methoxy silane
mono(alkylphenoxy)-gamma-(2-aminoethyl) aminopropyl dimethoxy silane
di(alkylphenoxy) gamma-(2-aminoethyl) aminopropyl methyl silane
mono(alkylphenoxy) gamma-(2-aminoethyl) aminopropyl methyl methoxy silane
tri(alkylphenoxy) vinyl silane
di(alkylphenoxy) vinyl methoxy silane
mono(alkylphenoxy) vinyl dimethoxy silane
di(alkylphenoxy) gamma-glycidoxypropyl methyl silane
mono(alkylphenoxy) gamma-glycidoxy propylmethyl methoxy silane
tri(alkylphenoxy) gamma-glycidoxy propyl silane
di(alkylphenoxy) gamma-glycidoxy propyl methoxy silane
mono(alkylphenoxy) gamma-glycidoxy propyl dimethoxy silane
di(alkylphenoxy) gamma-methacryloxy propyl methyl silane
mono(alkylphenoxy) gamma-methacryloxy propylmethyl methoxy silane
tri(alkylphenoxy) gamma-dibutylamino propyl silane
di(alkylphenoxy) gamma-dibutyl amino propyl methoxy silane
mono(alkylphenoxy)gamma-dibutylamino propyl dimethoxy silane
tri(alkylphenoxy) methacryloxy propyl silane
di(alkylphenoxy) methacryloxy propyl methoxy silane
mono(alkylphenoxy) methacryloxy propyl dimethoxy silane
tri(alkylphenoxy) nonafluorobutyl ethyl silane
di(alkylphenoxy) nonafluorobutyl ethyl methoxy silane
mono(alkylphenoxy) nonafluorobutyl ethyl dimethoxy silane
tri(alkylphenoxy) gamma-chloropropyl silane
di(alkylphenoxy) gamma-chloropropyl methoxy silane
mono(alkylphenoxy) gamma-chloropropyl dimethoxy silane
tri(alkylphenoxy) gamma-ureidopropyl silane
di(alkylphenoxy) gamma-ureidopropyl methoxy silane
mono(alkylphenoxy) gamma-ureidopropyl dimethoxy silane
mono(alkylphenoxy) dodecyl diethoxy silane
di(alkylphenoxy) dodecyl ethoxy silane
mono(alkylphenoxy) hexyl dimethoxy silane
di(alkylphenoxy) hexyl methoxy silane
mono(alkylphenoxy) octadecyl dimethyl silane
mono(alkylphenoxy) dimethyl butyl silane
mono(alkylphenoxy) dimethyl octadecyl silane and the like.

Another class of alkylphenoxy group containing organo-silicon compounds used in the present invention are alkylphenoxy bis-silyl compounds represented by the formula:

in which $X^1$ is selected from the group consisting of a hydrogen atom, a hydroxy group, a lower alkyl group having 1 to 5 carbon atoms, a lower alkoxy group having 1 to 5 carbon atoms, a phenyl group, a phenoxy group, a vinyl group, an acetoxy group, a propenyloxy group, a methyl ethyl ketoxim group, an alkylphenoxy group whose alkyl is a straight or branched chain alkyl having 7 to 12 carbon atoms and a 1-methyl-1-phenylethyl phenoxy group, providing that at least one of said $X^1$ is the straight or branched chain alkyl phenoxy group or 1-methyl-1-phenylethyl phenoxy group, and n is an integer of 1 to 10.

These alkylphenoxy bis-silyl compounds may be advantageously prepared by the reaction of a bis-silyl compound such as an alkoxy bis-silane and an alkyl phenol through dealcoholic reaction.

The third and fourth classes of alkylphenoxy group containing organo-silicon compounds used in the invention are the following alkylphenoxy polysiloxane represented by the formula:

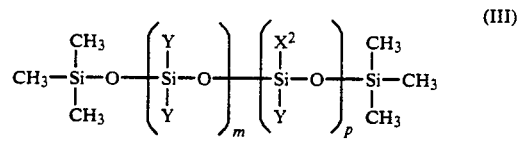

having a number average molecular weight of less than 100,000 in which Y is the same or different substituents and each represents a member selected from the group consisting of alkyl having 1 to 3 carbon atoms, a vinyl group and a phenyl group; $X^2$ is a member selected from the group consisting of a hydrogen atom, a halogen atom, a hydroxy group, an alkoxy group, an acyl group, an oximegroup, an amido group, a propenoxy group, an alkyl phenoxy group in which the alkyl is a straight or branched chain alkyl having 7 to 12 carbon atoms and 1-methyl-1-phenylethyl phenoxy group, providing that at least one $X^2$ is the abovesaid alkyl phenoxy group or a 1-methyl-1-phenylethyl phenoxy group; m is 0 or an integer of 1 or more; and p is an integer of 1 or more, and the alkylphenoxy polysiloxane represented by the formula:

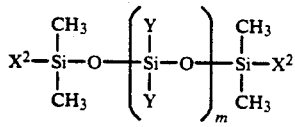
(IV)

having a number average molecular weight of less than 100,000 in which Y, $X^2$ and m are as defined above.

The abovementioned alkylphenoxy polysiloxanes of the formula (III) or (IV) may be advantageously prepared by the reaction of polysiloxane compounds represented by the formula:

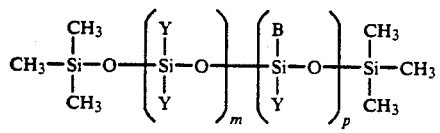
(V)

or

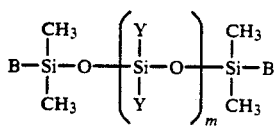
(VI)

in which Y represents the same or different substituents and each represents a member selected from the group consisting of alkyl having 1 to 3 carbon atoms, a vinyl group and phenyl group, m is 0 or an integer of 1 or more, p is an integer of 1 or more and B is a hydrogen atom, a halogen atom, a hydroxy group or an acyl group, and an alkyl phenol in which the alkyl group is a straight or branched chain alkyl having 7 to 12 carbon atoms or; a 1-methyl-1-phenylethyl phenol or reactive derivatives thereof, in the presence of an appropriate catalyst as an organoperacid, a fatty acid azo compound, an organometallic compound and the like, under heating or illuminating with UV rays, while removing the produced water, alcohol, organic acid, hydrogen halide, oxime, amine or amide out of the system, thereby introducing the alkylphenoxy group or 1-methyl-1-phenylethyl, phenoxy group in all or part of the B positions.

Alternatively, the alkylphenoxy polysiloxane represented by the formula (III) or (IV) may be prepared by polymerizing a polymerizable silane compound as hydroxy silane, halogenized silane or the like previously introduced with the abovementioned alkylphenoxy or 1-methyl-1-phenylethyl group and other polymerizable silane compounds through a dehydration, hydrolysis or condensation reaction.

Examples of the alkylphenoxy polysiloxane of the formula (III) are methyl alkylphenoxy silicone oil obtained by the reaction of methyl hydrogen silicone oil (B=hydrogen atom) and an alkyl phenol; a methyl alkylphenoxy silyl alkyl silicone oil obtained by the reaction of an alkoxy silyl alkyl silicone oil (B=methyl) and an alkyl phenol and the like.

Examples of the alkylphenoxy polysiloxanes of the formula (IV) are endo alkyl-phenoxy dimethyl polysiloxane obtained by the reaction of an endo-silanol containing dimethyl polysiloxane (B=HO) and an alkyl phenol; an endo alkyl-phenoxy methylphenyl polysiloxane obtained by the reaction of an endo silanol containing methyl phenyl polysiloxane and an alkyl phenol; an endo alkyl-phenoxy methyl phenyl polysiloxane obtained by the reaction of an endo alkoxy silyl containing methyl phenyl polysiloxane (B=alkoxy having 1 to 4 carbon atoms) and an alkyl phenol; an endo alkyl-phenoxy dimethyl diphenyl polysiloxane obtained by the reaction of an endo alkoxy silyl containing dimethyl diphenyl polysiloxane (B=alkoxy having 1 to 4 carbon atoms) and an alkyl phenol; an endo alkyl-phenoxy methyl propyl polysiloxane obtained by the reaction of an endo silanol containing methyl propyl polysiloxane (B=HO) and an alkyl phenol; and an endo alkyl-phenoxy dimethyl polysiloxane obtained by the reaction of a dimethyl hydrogen polysiloxane (B=H) and an alkyl phenol.

The fifth class of alkylphenoxy group containing organo-silicon compounds used in the present invention is an alkylphenoxy polysiloxane represented by the formula:

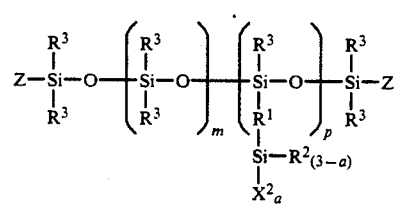
(VII)

having a number average molecular weight of less than 100,000, in which Z is a $-R^3$ or $-R^1-SiR^2_{(3-a)}X^2_a$ group; $R^1$ is an alkylene or aralkylene group having 2 to 20 carbon atoms which may include an ether, a thioether, an ester or a urethane bond; $R^2$ is an alkyl having 1 to 6 carbon atoms, a phenyl or a cycloalkyl having up to 6 carbon atoms; $R^3$ is an alkyl having 1 to 10 carbon atoms, aryl or aralkyl group; $X^2$ is a member selected from the group consisting of a hydrogen atom, a halogen atom, a hydroxy group, an alkoxy group, an acyl group, an oxime group, an amido group, a propenoxy group, an alkyl phenoxy group in which the alkyl is a straight or branched chain alkyl having 7 to 12 carbon atoms and a 1-methyl-1-phenylethyl phenoxy group, providing that at least one $X^2$ is the abovesaid alkyl phenoxy group or 1-methyl-1-phenylethyl phenoxy group; m is 0 or an integer of 1 or more; p is an integer of 1 or more; and a is an integer of 1 to 3.

Such alkylphenoxy polysiloxanes (VII) may be advantageously prepared by the reaction of organopolysiloxanes (VIII) reported in Japanese Patent Publication (unexamined) No 43454/92 and represented by the formula:

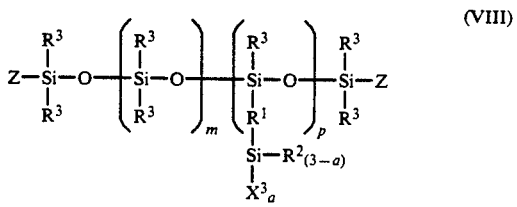
(VIII)

in which Z, $R^1$, $R^2$, $R^3$ m, p, a are as defined above, and $X^3$ is an alkoxy group having 1 to 4 carbon atoms, and at least one phenol having $C_7$-$C_{12}$ straight or branched alkyl group or 1-methyl-1-phenylethyl group.

The present antifouling paint consists essentially of the above mentioned alkyl phenoxy group containing organo-silicon compound and a solvent, the amount of said organo-silicon compound being 5 to 100% by weight of the total solid of the paint. The solvent used may be water, an organic solvent or mixture thereof. The present paint may further contain a resin which is common in a coating composition.

For example, in a solvent type paint, the following may be used each singularly or in the combination of two or more, as desired: a vinyl chloride resin, a chlorinated rubber, a chlorinated polyethylene, a chlorinated polypropylene, an acrylic resin, a styrene-butadiene polymer, a polyester resin, an epoxy resin, a polyamide resin, a petroleum resin, a silicone resin, a silicone rubber, wax, paraffin, a rosin ester, a rosin resin, and a resin, having in its side chains, a metal such as tin, copper, zinc, tellurium and the like. Examples of the resins used in an aqueous paint, are acryl emulsion resins, epoxy emulsion resins, vinyl acetate resins and the like.

If required, the present paint may be added with other known antifouling agents such as co-toxicants, plasticizers, colorants, body pigments, solvents and the like. In preparing the present antifouling paint, any of the conventional preparation techniques may be satisfactorily used.

The invention shall be now more fully explained in the following Examples. Unless otherwise being stated, all parts and % are by weight.

Manufacturing Example 1

Into a reaction vessel fitted with a decanter, was placed 262 parts of n-decyl trimethoxy silane, 220 parts of nonyl phenol and 2.4 parts of tetra-n-butoxy titanium and the mixture was heated to 120° C. in 30 minutes. Thereafter, the condensation reaction was effected at 120°–200° C. for 5 hours, during which time 31 parts of methanol were recovered. The thus obtained alkyl phenoxy containing silane compound A was a slightly brown-colored clear liquid having a viscosity of 3.5 poise.

Manufacturing Example 2

Into a reaction vessel, was placed 19.1 parts of phenylmethyl dichlorosilane, 252 parts of toluene and 8.7 parts of puridine and the mixture was heated to 40° C. To this, 44 parts of nonyl phenol were dropwise added in one hour and the combined surface was maintained at the same temperature for 5 hours. The thus obtained white turbid liquid was filtered and from the filtrate, toluene was removed by using an evaporater. The thus obtained alkylphenoxy containing silane compound B was a clear liquid, whose viscosity was 12 poise.

Manufacturing Example 3

Into a reaction vessel fitted with a fractionating column, was placed 120 parts of dimethyl dimethoxy silane, 440 parts of nonyl phenol and 3.0 parts of tetra-n-butoxy titanium and the mixture was heated to 75° C. in 20 minutes. Thereafter, the condensation reaction was effected at 75° to 80° C. for 3 hours, during which time 60 parts of methanol were recovered. The thus obtained nonyl phenoxy dimethyl silane C was a colourless clear liquid having a viscosity of 0.1 poise.

Manufacturing Example 4

Into a reaction vessel fitted with a fractionating column, was placed 130 parts of phenyl trimethoxy silane, 425 parts of 4-(1-methyl-1-phenylethyl) phenol and 3.0 parts of tetra-n-butoxy titanium and the mixture was heated to 100° C. in 30 minutes. Thereafter, the condensation reaction was effected at a temperature of up to 200° C. for 3 hours, during which time 53 parts of methanol were recovered. The thus obtained substituted phenoxy containing silane D was a pale brown clear liquid having a viscosity of 21 poise.

EXAMPLES 1–7

Various paints were prepared by mixing the indicated amounts of components in Table 1 by using a high speed homodisper. The thus obtained paints each was applied on sand papered hard vinyl chloride plate (30×10×0.3 cm) in about 100 microns of dry thickness.

Comparative Examples 1–2

Using the materials shown in Table 2 and following the procedures of Examples 1–6, comparative paints were prepared and applied on the similar vinyl chloride plate.

In Table 2, amylphenoxy dimethyl silane was prepared by using the same procedures as stated in Manufacturing Example 3 but substituting p-t-amyl phenol for nonyl phenol.

TABLE 1

| Example | 1 | 2 | 3 | 4 | 5 | 6 | 7 |
|---|---|---|---|---|---|---|---|
| compound A | 25 | | | | 10 | | |
| compound B | | 25 | | | | 10 | |
| Compound C | | | 25 | 5 | 10 | 10 | |
| Compound D | | | | | | | 25 |
| KE-45-TS[*1] | 50 | 50 | 50 | 50 | 50 | 50 | 50 |
| KF-96[*2] | 10 | 10 | 10 | 20 | 15 | 15 | 15 |
| petrolatam[*3] | 5 | 5 | 5 | 20 | 15 | 15 | 15 |
| xylene | 10 | 10 | 10 | 5 | — | — | 10 |
| Total | 100 | 100 | 100 | 100 | 100 | 100 | 100 |

[*1] liquid type RTV silicone rubber (NV = 50%) (Shinetu Chem. Co.)
[*2] dimethyl silicone oil (NV = 100%) (Shinetu Chem. Co.)
[*3] JIS K-2235 Petrolatam No. 4

TABLE 2

| Comp. Example | 1 | 2 |
|---|---|---|
| compound A | | |
| compound B | | |
| Compound C | | |
| amyl phenoxy dimethyl silane | 25 | |
| KE-45-TS[*1] | 50 | 50 |
| KF-96[*2] | 10 | 20 |
| petrolatam[*3] | 5 | 20 |
| xylene | 10 | 10 |
| Total | 100 | 100 |

The coated plates obtained in Examples 1–7 and Comparative Examples 1–2 and uncoated plate were placed in sea water in 1 meter depth at Tamano City, Okayama Pref. and the antifouling effects were evaluated. The test results are shown in Table 3.

TABLE 3

| Test duration (month) | 1 | 2 | 3 | 4 | 6 |
|---|---|---|---|---|---|
| Example 1 | 0 | 0 | 0 | 0 | 0 |
| Example 2 | 0 | 0 | 0 | 0 | 0 |
| Example 3 | 0 | 0 | 0 | 0 | 0 |
| Example 4 | 0 | 0 | 0 | 0 | 0 |
| Example 5 | 0 | 0 | 0 | 0 | 0 |
| Example 6 | 0 | 0 | 0 | 0 | 0 |
| Example 7 | 0 | 0 | 0 | 0 | 0 |
| Comp. Ex. 1 | 0 | 0 | 5 | 10 | 20 |
| Comp. Ex. 2 | 0 | 5 | 10 | 30 | 50 |

TABLE 3-continued

| Test duration (month) | 1 | 2 | 3 | 4 | 6 |
|---|---|---|---|---|---|
| Uncoated | 10 | 30 | 50 | 60 | 80 |

(each figure shows stained area %)

Manufacturing Example 5

Into a reaction vessel fitted with a fractionating column, was placed 326 parts of 1,6-bis(trimethoxysilyl) hexane, 440 parts of nonyl phenol and 3.0 parts of tetra-n-butoxy titanium and the mixture was heated under normal pressure to 120° C. in 30 minutes. Thereafter, the condensation reaction was effected at 120°-180° C. for 4 hours, during which time 60 parts of methanol were recovered. The reaction was confirmed by the infra red absorption spectrum, i.e. appearance of absorption peak at 940 $cm^{-1}$ caused by phenoxysilyl and disappearance of absorption peak at 3400 $cm^{-1}$ caused by the hydroxyl group of nonyl phenol. The thus obtained alkyl phenoxy bissilyl compound E was a clear liquid having a viscosity of 2.0 poise.

Manufacturing Example 6

Into a reaction vessel fitted with a fractionating column, was placed 326 parts of 1,6-bis(trimethoxysilyl) hexane, 576 parts of heptyl phenol and 3.0 parts of tetra-n-butoxy titanium and the mixture was heated under normal pressure to 120° C. in 30 minutes. Thereafter, the condensation reaction was effected at 120°-150° C. for 4 hours, during which time 90 parts of methanol were recovered. The reaction was confirmed by the infra red absorption spectrum, i.e. the appearance of an absorption peak at 940 $cm^1$ caused by phenoxysilyl and disappearance of absorption peak at 3400 $cm^{-1}$ caused by the hydroxyl group of heptyl phenol. The thus obtained alkyl phenoxy bissilyl compound F was a clear liquid having a viscosity of 18.0 poise.

Manufacturing Example 7

Into a reaction vessel fitted with a fractionating column, was placed 326 parts of 1,6-bis(trimethoxysilyl) hexane, 1320 parts of nonyl phenol and 5.0 parts of tetra-n-butoxy titanium and the mixture was heated under normal pressure to 120° C. in 30 minutes. Thereafter, the condensation reaction was effected at 120°-200° C. for 5 hours, during which time 180 parts of methanol was recovered. The reaction was confirmed by the infra red absorption spectrum, i.e. appearance of absorption peak at 40 $cm^{-1}$ caused by phenoxysilyl and the disappearance of an absorption peak at 3400 $cm^{-1}$ caused by the hydroxyl group of nonyl phenol. The thus obtained alkyl phenoxy bissilyl compound G was a clear liquid having a viscosity of 64.0 poise.

Manufacturing Example 8

Into a reaction vessel fitted with a fractionating column, were placed 326 parts of 1,6-bis(trimethoxysilyl) hexane, 1048 parts of dodecyl phenol and 5.0 parts of tetra-n-butoxy titanium and the mixture was heated under normal pressure to 120° C. in 30 minutes. Thereafter, the condensation reaction was effected at 120°-° C. for 5 hours, during which time 125 parts of methanol were recovered. The reaction was confirmed by the infra red absorption spectrum, i.e. appearance of absorption peak at 940 $cm^{-1}$ caused by phenoxysilyl and the disappearance of an absorption peak at 3400 $cm^{-1}$ caused by the hydroxyl group of dodecyl phenol. The thus obtained alkyl phenoxy bissilyl compound H was a clear liquid having a viscosity of 50.0 poise.

Manufacturing Example 9

Into a reaction vessel fitted with a fractionating column, was placed 110 parts of 1,6-bis(trimethoxysilyl) hexane, 425 parts of 4-(1-methyl-1-phenylethyl) phenol and 2.5 parts of tetra-n-butoxy titanium and the mixture was heated under normal pressure to 100° C. in 30 minutes. Thereafter, the condensation reaction was effected at a temperature of up to 200° C. for 3 hours, during which time 54 parts of methanol were recovered. The reaction was confirmed by the infra red absorption spectrum, i.e. appearance of an absorption peak at 940 $cm^{-1}$ caused by phenoxysilyl and disappearance of absorption peak at 3400 $cm^{-1}$ caused by the hydroxyl group of 4-(1-methyl-1-phenylethyl) phenol. The thus obtained substituted phenoxy bissilyl compound I was a clear liquid having a viscosity of 45.0 poise.

EXAMPLES 8-16

Comparative Examples 3-4

The alkyl phenoxy bissilyl compounds and other materials shown in Table 4 were mixed and dispersed well by means of SG mill with glass beads and the antifouling paints were prepared. Next, the present antifouling paints and comparative paints each was applied on a commercialized test steel plate previously coated with a conventional antifouling paint (100×300 mm) in a dry film thickness of 60 to 80 microns and dried for 1 day. The thus prepared test plates were dipped in sea water in 1 m depth at Tamano City, Okayama Pref. and degree of stain was examined. As a control, the commercialized test plate was tested in Comparative Example 4. The test results are shown in Table 5.

TABLE 4

| | paint composition | | | | | | | | |
|---|---|---|---|---|---|---|---|---|---|
| | Example | | | | | | | | Comp. |
| | 8 | 9 | 10 | 11 | 12 | 13 | 14 | 15 | 16 | Ex. 3 |
| Compound E | 20 | | | | 10 | | 10 | | | |
| Compound F | | 20 | | | | | | | | |
| Compound G | | | 20 | | | 5 | | 10 | | |
| Compound H | | | | 20 | 10 | | | | | |
| Compound I | | | | | | | | | 20 | |
| Raloflex MP-45 | 25 | 25 | 25 | 25 | 25 | 25 | | | 25 | 25 |
| WW rosin | 25 | 25 | 25 | 25 | 25 | 25 | | | 25 | 25 |
| cuprous oxide | | | | | | 15 | | | | 30 |
| fluid paraffin | | | | | | | 5 | | | |
| KE45-TS | | | | | | | 60 | 50 | | |
| SH-510 oil | | | | | | | | 5 | | |
| dioctyl phthalate | 1 | 1 | 1 | 1 | 1 | 1 | | | 1 | 1 |
| colloidal silica | 1 | 1 | 1 | 1 | 1 | 1 | | | 1 | 1 |
| xylene | 20 | 20 | 20 | 20 | 20 | 20 | 30 | 30 | 20 | 15 |
| MBK | 8 | 8 | 8 | 8 | 8 | 8 | | | 8 | 3 |
| total | | | | | 100 | | | | | 100 |

Raloflex MP-45 ... vinyl chloride.vinylisopropyl ether copolymer manufactured by BASF
fluid paraffin ... JIS K2231
KE45 ... 1 liquid type room temp. curing silicone rubber
SH-510 oil ... methyl phenyl silicone oil, manufactured by Toray Silicone

TABLE 5

| Sea water immersion test (stained area %) | | | | | |
|---|---|---|---|---|---|
| time duration | 1 | 3 | 6 | 12 | 24 months |
| Example 8 | 0 | 0 | 0 | 0 | 5 |
| Example 9 | 0 | 0 | 0 | 0 | 5 |
| Example 10 | 0 | 0 | 0 | 0 | 5 |
| Example 11 | 0 | 0 | 0 | 0 | 5 |
| Example 12 | 0 | 0 | 0 | 0 | 3 |
| Example 13 | 0 | 0 | 0 | 0 | 5 |
| Example 14 | 0 | 0 | 0 | 0 | 3 |

TABLE 5-continued

| | Sea water immersion test (stained area %) | | | | |
|---|---|---|---|---|---|
| time duration | 1 | 3 | 6 | 12 | 24 months |
| Example 15 | 0 | 0 | 0 | 0 | 3 |
| Example 16 | 0 | 0 | 0 | 0 | 5 |
| Comp. Ex. 3 | 0 | 0 | 10 | 30 | 50 |
| Comp. Ex. 4 | 10 | 30 | 50 | 70 | 100 |

Manufacturing Example 10

Into a reaction vessel fitted with a decanter, was placed 100 parts of both ends of alkoxysilyl methylphenyl polysiloxane (OCH₃ 15 wt %, viscosity 9.9 poise), 107 parts of nonyl phenol and 1.0 parts of tetra-i-propoxy titanium and the mixture was heated under normal pressure to 120° C. in 30 minutes, to 220° C. in 1.5 hours and then to 240° C. in 4.5 hours to effect a condensation reaction, during which time 12.4 parts of methanol were recovered. The thus obtained alkyl phenoxy silyl containing polysiloxane J was a slightly brown clear viscous liquid having a viscosity of 71 poise.

Manufacturing Example 11

Into a reaction vessel, was placed 20 parts of both ends SiH dimethyl hydrogen polysiloxane (MW=1,000; viscosity 0.07 poise), 8.8 parts of nonyl phenol and 0.01 part of 2 wt % chloroplatinic acid-isopropanol solution and the combined mixture was heated to 100° C. and a dehydration reaction effected for 5 hours. The thus obtained alkylphenoxy silyl containing polysiloxane K was a clear liquid having a viscosity of 8.5 poise.

Manufacturing Example 12

Into a reaction vessel, was placed 20 parts of a methyl hydrogen silicone oil having a hydrogen atom at the main chain Si (MW=1,000; viscosity 0.3 poise), 50 parts of nonyl phenol and 0.03 part of 2 wt % chloroplatinic acid-isopropanol solution and the combined was heated to 100° C. and effected a dehydration reaction effected for 5 hours. The thus obtained methylalkylphenoxy silicone oil L was a clear liquid having a viscosity of 9.0 poise.

Manufacturing Example 13

Into a reaction vessel fitted with a decanter, was placed 158 parts of an alkoxysilylalkyl group containing organo-polysiloxane represented by the formula:

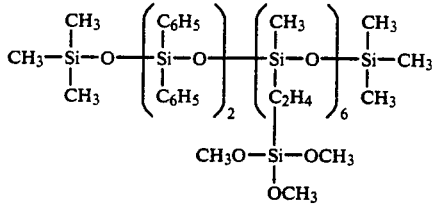

220 parts of nonyl phenol and 2.0 parts of tetra-i-propoxy titanium and the mixture was heated under normal pressure to 120° C. in 30 minutes, to 180° C. in 2 hours and then to 220° C. in 2 hours to effect a condensation reaction, during which time 29.0 parts of methanol were recovered. The thus obtained alkyl phenoxy sily containing polysiloxane M was a pale brown clear viscous liquid having a viscosity of 70 poise.

Manufacturing Example 14

Into a reaction vessel, was placed 92 parts of an alkoxysilyl alkyl group containing an organo-polysiloxane represented by the formula:

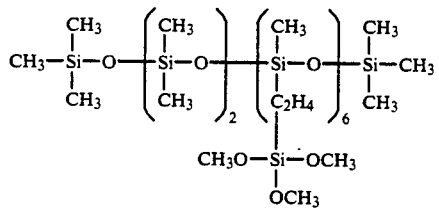

212 parts of 4-(1-methyl-1-phenylethyl) phenol and 1.5 parts of tetra-i-propoxy titanium and the combined mixture was heated to 120° C. in 1 hour, to 190° C. in 1 hour and then to 220° C. in 2.5 hours to effect a condensation reaction, during which time, 28.8 parts of methanol were recovered. The thus obtained substituted phenoxy silyl containing polysiloxane N was a pale brown clear viscous liquid having a viscosity of 85 poise.

EXAMPLES 17-24

The materials shown in Table 6 were mixed well by using a high speed homodisper to obtain the present antifouling paints. Each paint was applied onto a sand papered hard vinyl chloride plate (30×10×0.3 cm) in a dry film thickness of about 100 microns.

Comparative Examples 5 and 6

Using the materials shown in Table 7, similar paints were prepared as in Examples 17-24.

The thus obtained coated plates were dipped in sea water in 1 m depth at Tamano City, Okayama Pref. and evaluated the stain degree. The test results are shown in Table 8.

TABLE 6

| Example | 17 | 18 | 19 | 20 | 21 | 22 | 23 | 24 |
|---|---|---|---|---|---|---|---|---|
| compound J | 25 | | | | | 10 | | |
| compound K | | 25 | | | | | 10 | |
| Compound L | | | 25 | 5 | 10 | 10 | | |
| Compound M | | | | | | | 25 | |
| Compound N | | | | | | | | 25 |
| amylphenoxy methyl phenyl polysiloxane | | | | | | | | |
| vinyl chloride resin | | | | | | | | |

TABLE 6-continued

| Example | 17 | 18 | 19 | 20 | 21 | 22 | 23 | 24 |
|---|---|---|---|---|---|---|---|---|
| KE-45-TS | 50 | 50 | 50 | 50 | 50 | 50 | 50 | 50 |
| KF-96 | 10 | 10 | 10 | 20 | 15 | 15 | 10 | 10 |
| fluid paraffin | 5 | 5 | 5 | 20 | 15 | 15 | 5 | 5 |
| petrolatam | | | | | | | | |
| xylene | 10 | 10 | 10 | 5 | | | 10 | 10 |
| Total | 100 | 100 | 100 | 100 | 100 | 100 | 100 | 100 |

TABLE 7

| Comp. Example | 5 | 6 |
|---|---|---|
| amylphenoxy methyl phenyl polysiloxane | | 25 |
| vinyl chloride resin | | |
| KE-45-TS | 50 | 50 |
| KF-96 | 20 | 10 |
| fluid paraffin | 20 | 5 |
| petrolatam | | |
| xylene | 10 | 10 |
| Total | 100 | 100 |

TABLE 8

| | Antifouling test (stain area %) | | | | | | |
|---|---|---|---|---|---|---|---|
| dipping time (month) | 1 | 3 | 6 | 9 | 12 | 18 | 24 |
| Example 17 | 0 | 0 | 0 | 0 | 0 | 0 | 5 |
| Example 18 | 0 | 0 | 0 | 0 | 0 | 0 | 5 |
| Example 19 | 0 | 0 | 0 | 0 | 0 | 0 | 5 |
| Example 20 | 0 | 0 | 0 | 0 | 0 | 0 | 10 |
| Example 21 | 0 | 0 | 0 | 0 | 0 | 0 | 5 |
| Example 22 | 0 | 0 | 0 | 0 | 0 | 0 | 5 |
| Example 23 | 0 | 0 | 0 | 0 | 0 | 0 | 5 |
| Example 24 | 0 | 0 | 0 | 0 | 0 | 0 | 5 |
| Comp. Ex. 5 | 5 | 25 | 40 | 50 | 80 | 100 | 100 |
| Comp. Ex. 6 | 0 | 10 | 10 | 10 | 50 | 80 | 100 |
| Uncoated | 10 | 50 | 80 | 100 | 100 | 100 | 100 |

EXAMPLES 25-30

Antifouling treating agents for fishnet use were prepared by mixing the materials shown in Table 9 by a high speed homodisper. Polyethylene fishnets (100×100 cm) were dipped into the thus prepared compositions and dried.

Comparative Examples 7 and 8

Similar experiments were carried out using the materials shown in Table 10 for the treating compositions.

The thus obtained fishnets were immersed in sea water in 1 m depth at Tamano City, Okayama Pref. and evaluated the antifouling effects. The test results are shown in Table 11.

TABLE 9

| Example | 25 | 26 | 27 | 28 | 29 | 30 |
|---|---|---|---|---|---|---|
| compound J | 30 | | | | | |
| compound K | | 20 | | 5 | | |
| Compound L | | | 20 | | | |
| Compound M | | | | | | |
| Compound N | | | | | 20 | 5 |
| amylphenoxy methyl phenyl polysiloxane | | | | | | |
| vinyl chloride resin | | | | 10 | | 10 |
| KE-45-TS | | | | | | |
| KF-96 | | | | | | |
| fluid paraffin | 5 | 5 | 5 | 5 | 5 | 5 |
| petrolatam | 5 | 5 | 5 | 5 | 5 | 5 |
| xylene | 60 | 70 | 70 | 75 | 70 | 75 |
| Total | 100 | 100 | 100 | 100 | 100 | 100 |

Table 10

| Comp. Example | 7 | 8 |
|---|---|---|
| compound H | | |
| compound I | | |
| Compound J | | |
| amylphenoxy methyl phenyl polysiloxane | | 30 |
| vinyl chloride resin | 15 | |
| KE-45-TS | | |
| KF-96 | | |
| fluid paraffin | 5 | 5 |
| petrolatam | 5 | 5 |
| xylene | 75 | 60 |
| Total | 100 | 100 |

TABLE 11

| | Antifouling test (clogging area %) | | | | |
|---|---|---|---|---|---|
| dipping time (month) | 1 | 2 | 3 | 5 | 6 |
| Example 25 | 0 | 0 | 0 | 0 | 0 |
| Example 26 | 0 | 0 | 0 | 0 | 5 |
| Example 27 | 0 | 0 | 0 | 0 | 5 |
| Example 28 | 0 | 0 | 0 | 0 | 5 |
| Example 29 | 0 | 0 | 0 | 0 | 0 |
| Example 30 | 0 | 0 | 0 | 0 | 0 |
| Comp. Ex. 7 | 20 | 40 | 80 | 100 | 100 |
| Comp. Ex. 8 | 0 | 10 | 30 | 50 | 80 |
| Uncoated | 30 | 50 | 90 | 100 | 100 |

What is claimed is:

1. An antifouling paint consisting essentially of an alkyl-phenoxy group containing an organo-silicon compound in an amount of 5 to 100% by weight of total solid content of the paint, and a solvent in an amount of 5 to 80% by weight of the paint, said alkyl-phenoxy group containing organo-silicon compound being one of the following members:

(A) an alkylphenoxy bis-silyl compound of the formula:

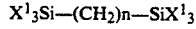

$$X^1{}_3Si-(CH_2)n-SiX^1{}_3$$

wherein each of the X radicals is selected from the group consisting of a hydrogen atom, a hydroxy group, a lower alkyl group having 1 to 5 carbon atoms, a lower alkoxy group having 1 to 5 carbon atoms, a phenyl group, a phenoxy group, a vinyl group, an acetoxy group, a propenyloxy group, a methyl ethyl ketoxim group, and an alkyl-phenoxy group in which the alkyl substituent represents a straight or branched $C_7$-$C_{12}$ alkyl or 1-methyl-1-phenylethyl, providing that at least one of the $X^1$ radicals is the defined alkyl-phenoxy group, and n is an integer of 1 to 10;

(B) an alkylphenoxy polysiloxane represented by the formula:

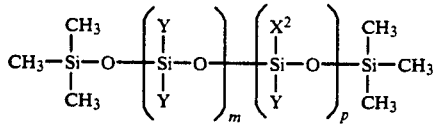

having a number average molecular weight of less than 100,000, wherein each of the Y radicals is selected from the group consisting of $C_1$-$C_3$ alkyl, vinyl and phenyl groups; each $X^2$ in the formula is selected from the group consisting of a hydrogen atom, a halogen atom, a hydroxy group, an alkoxy group, an acyl group, an oxime group, an amido group, a propenoxy group, and an alkyl-phenoxy group in which the alkyl substituent represents a straight or branched $C_7$-$C_{12}$ alkyl or 1-methyl-1-phenylethyl, providing that at least one of said $X^2$ radicals is the defined alkyl-phenoxy group; m is 0 or an integer of 1 or more; and p is an integer of 1 or more;

(C) an alkylphenoxy polysiloxane represented by the formula:

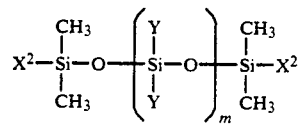

having a number average molecular weight of less than 100,000, wherein each of the Y radicals is selected from the group consisting of $C_1$-$C_3$ alkyl, vinyl and phenyl groups; each of the $X^2$ radicals is selected from the group consisting of a hydrogen atom, a halogen atom, a hydroxy group, an alkoxy group, an acyl group, an oxime group, an amido group, a propenoxy group, and an alkyl-phenoxy group in which the alkyl substituent represents a straight or branched $C_7$-$C_{12}$ alkyl or 1-methyl-1-phenylethyl, providing at least one of said $X^2$ radicals is an alkyl-phenoxy group; and m is 0 or an integer of 1 or more; and (D) an alkylphenoxy polysiloxane represented by the formula:

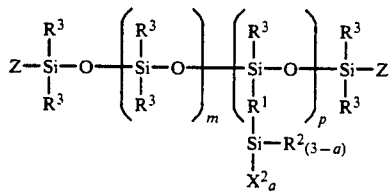

having a number average molecular weight of less than 100,000, wherein Z is an —$R^3$ or an —$R^1$—Si—$R^2_{(3-a)}$ group;
$X^2_a$ $R^1$ is an alkylene or aralkylene having 2 to 20 carbon atoms which may include an ether, a thioether, an ester or a urethane bond; $R^2$ is an alkyl having 1 to 6 carbon atoms, phenyl or cycloalkyl having up to 6 carbon atoms; $R^3$ is an alkyl having 1 to 10 carbon atoms, aryl or aralkyl group; each of the $X^2$ radicals is selected from the group consisting of a hydrogen atom, a halogen atom, a hydroxy group, an alkoxy group, an acyl group, an oxime group, an amido group, a propenoxy group, and an alkylphenoxy group in which the alkyl substituent represents a straight or branched $C_7$-$C_{12}$ alkyl or 1-methyl-1-phenylethyl, providing at least one of said $X^2$ radicals should be the defined alkylphenoxy group; m is 0 or an integer of 1 or more; p is an integer of 1 or more; and a is an integer of 1 to 3.

2. An antifouling paint according to claim 1 wherein said alkyl-phenoxy group containing organo-silicon compound is (A) an alkylphenoxy bis-silyl compound of the formula:

wherein each of the X radicals is selected from the group consisting of a hydrogen atom, a hydroxy group, a lower alkyl group having 1 to 5 carbon atoms, a lower alkoxy group 1 to 5 carbon atoms, a phenyl group, a phenoxy group, a vinyl group, an acetoxy group, propenyloxy group, a methyl ethyl ketoxim group, and an alkyl-phenoxy group in which the alkyl substituent represents a straight or branched $C_7$-$C_{12}$ alkyl or 1-methyl-1-phenylethyl, providing that at least one of $X^1$ radicals is the defined alkyl-phenoxy group, and n is an integer of 1 to 10.

3. An antifouling paint according to claim 1 wherein said alkyl-phenoxy group containing organo-silicon compound is (B) an alkylphenoxy polysiloxane represented by the formula:

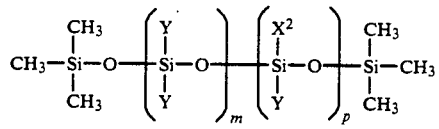

having a number average molecular weight of less than 100,000, wherein each of the Y radicals is selected from the group consisting of $C_1$-$C_3$ alkyl, vinyl and phenyl groups; each $X^2$ in the formula is selected from the group consisting of a hydrogen atom, a halogen atom, a hydroxy group, an alkoxy group, an acyl group, an oxime group, an amido group, a propenoxy group, and an alkyl-phenoxy group in which the alkyl substituent represents a straight or branched $C_7$-$C_{12}$ alkyl or 1-methyl-1-phenylethyl, providing that at least one of said $X^2$ radicals is the defined alkyl-phenoxy group; m is 0 or an integer of 1 or more; and p is an integer of 1 or more.

4. An antifouling paint according to claim 1 wherein said alkyl-phenoxy group containing organo-silicon compound is (C) an alkylphenoxy polysiloxane represented by the formula:

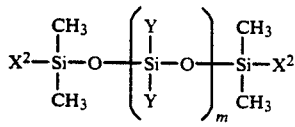

having a number average molecular weight of less than 100,000, wherein each of the Y radicals is selected from the group consisting of $C_1$–$C_3$ alkyl, vinyl and phenyl groups; each of the $X^2$ radicals is selected from the group consisting of a hydrogen atom, a halogen atom, a hydroxy group, an alkoxy group, an acyl group, an oxime group, an amido group, a propenoxy group, and an alkyl-phenoxy group in which the alkyl substituent represents a straight or branched $C_7$–$C_{12}$ alkyl or 1-methyl-1-phenylethyl, providing at least one of said $X^2$ radicals is an alkyl-phenoxy group; and m is 0 or an integer of 1 or more.

5. An antifouling paint according to claim 1 wherein said alkyl-phenoxy group containing organo-silicon compound is (D) an alkylphenoxy polysiloxane represented by the formula:

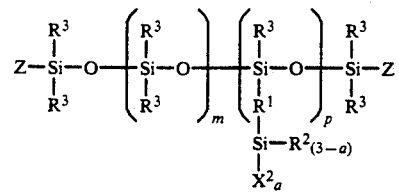

having a number average molecular weight of less than 100,000, wherein Z is an —$R^3$ or an

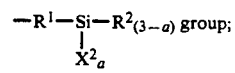

$R^1$ is an alkylene or aralkylene having 2 to 20 carbon atoms which may include an ether, a thioether, an ester or a urethane bond; $R^2$ is an alkyl having 1 to 6 carbon atoms, phenyl or cycloalkyl having up to 6 carbon atoms; $R^3$ is an alkyl having 1 to 10 carbon atoms, aryl or aralkyl group; each of the $X^2$ radicals is selected from the group consisting of a hydrogen atom, a halogen atom, a hydroxy group, an alkoxy group, an acyl group, an oxime group, an amido group, a propenoxy group, and an alkyl-phenoxy group in which the alkyl substituent represents a straight or branched $C_7$–$C_{12}$ alkyl or 1-methyl-1-phenylethyl, providing at least one of said $X^2$ radicals should be the defined alkyl-phenoxy group; m is 0 or an integer of 1 or more; p is an integer of 1 or more; and a is an integer of 1 to 3.

* * * * *